3 # United States Patent Office 2,824,535
Patented Feb. 25, 1958

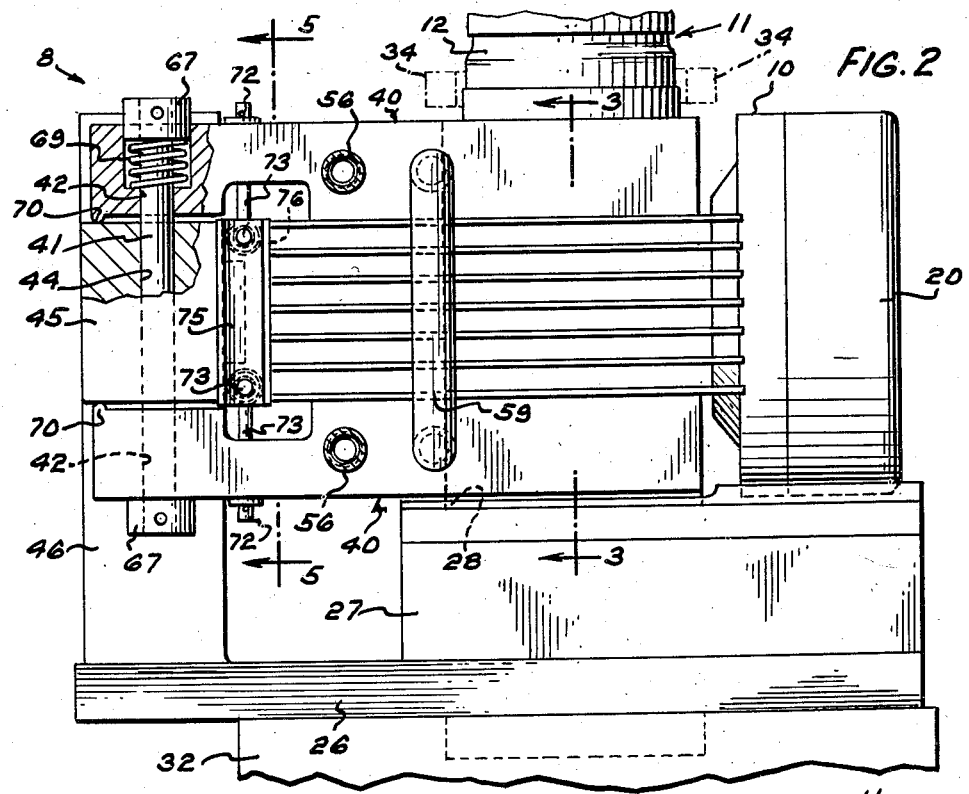
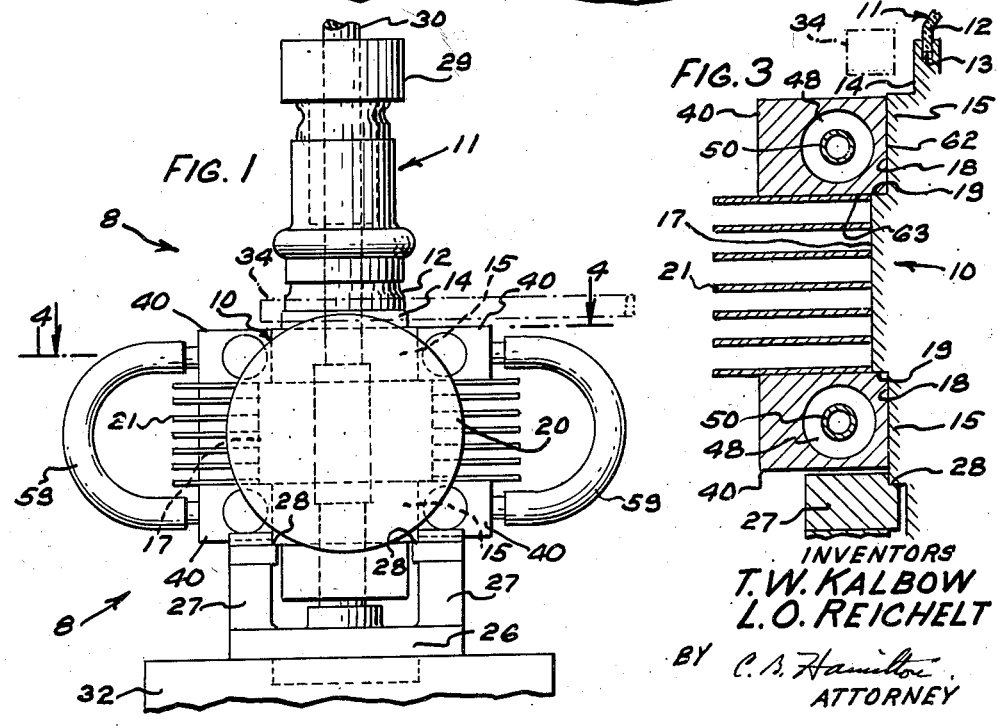

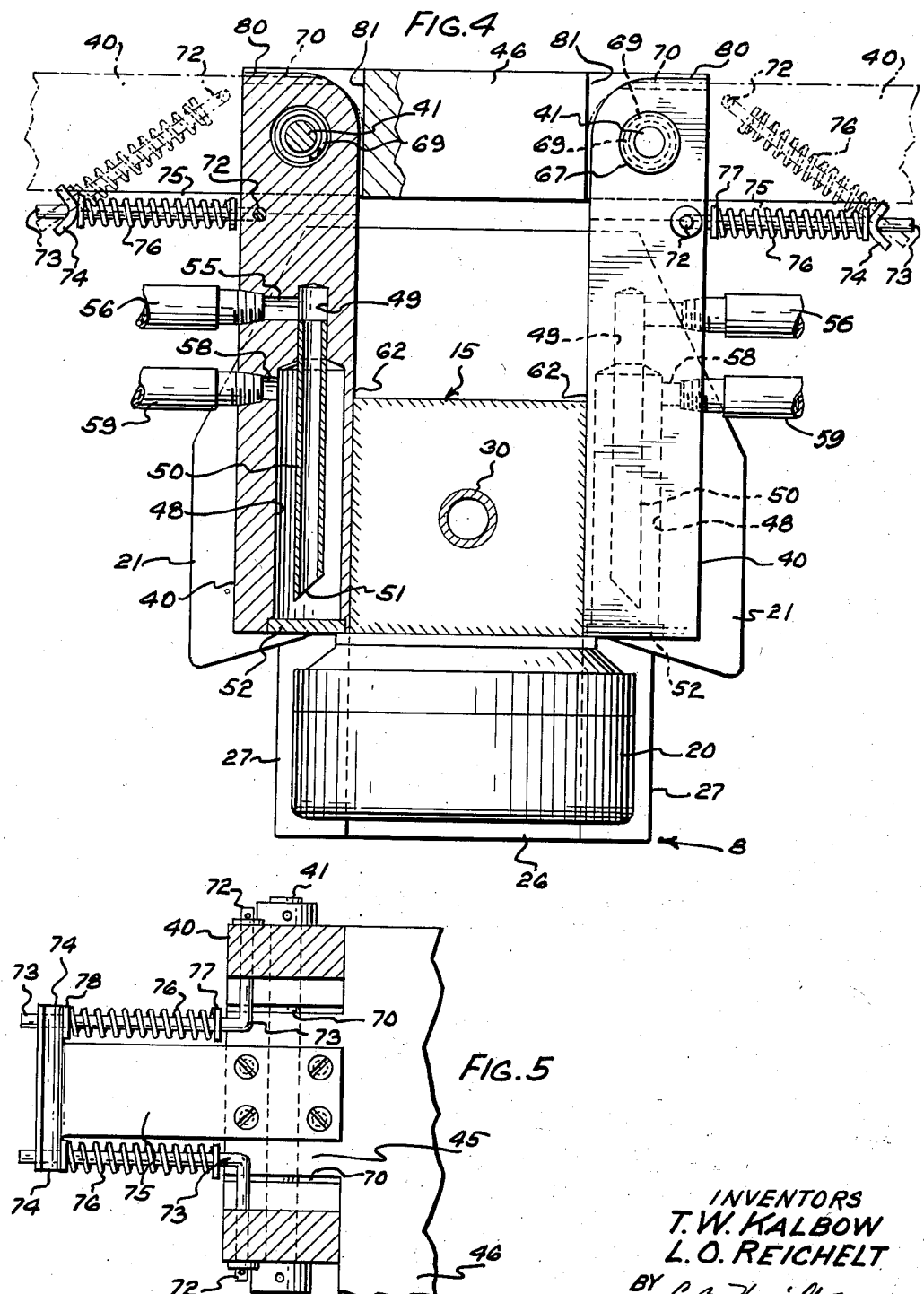

2,824,535
FIXTURE FOR SUPPORTING AND COOLING PARTS DURING BRAZING

Theodore W. Kalbow, Chicago, Ill., and Lester O. Reichelt, St. Paul, Minn., assignors to Western Electric Company, Incorporated, New York, N. Y., a corporation of New York Application March 30, 1954, Serial No. 419,776

2 Claims. (Cl. 113—98)

This invention relates to a fixture for supporting and cooling parts while they are being bonded together and more particularly to a fixture for supporting components of a magnetron electronic tube and cooling one of the components while they are being brazed together.

It is an object of the present invention to provide an improved fixture for supporting and cooling a composite article while a pair of components thereof are being brazed together.

It is a further object of the invention to provide a fixture for supporting a pair of components of a magnetron electronic tube in engagement with each other and for cooling one of the components while they are being brazed together.

A fixture illustrating certain features of the invention may include a base having a seat for supporting a pair of components of a magnetron electronic tube in engagement with each other, and having a bracket for pivotally supporting a plurality of hollow cooling elements for movement into and out of engagement with spaced portions of one of the components for cooling it by means of a coolant circulated through the elements, and spring means for yieldably maintaining the cooling elements in engagement with a first set of surfaces on the magnetron component and a second set of surfaces thereon disposed transversely of said first set.

Other objects and advantages of the invention will become apparent by reference to the following detailed description and the accompanying drawings illustrating a preferred embodiment thereof, in which:

Fig. 1 is a front elevational view of the fixture with the magnetron components therein;

Fig. 2 is an enlarged side elevational view of the fixture as viewed from the left of Fig. 1;

Fig. 3 is a fragmentary vertical sectional view taken along the line 3—3 of Fig. 2;

Fig. 4 is a plan sectional elevational view taken along the line 4—4 of Fig. 1; and Fig. 5 is a fragmentary sectional view taken along the line 5—5 of Fig. 2.

The present fixture 8 is designed to support and cool a body component 10 of a magnetron electronic tube while a tubular component 11 is being brazed thereto. The component 11 has a metal sleeve 12, the lower end of which is positioned with a ring of brazing material 13 (Fig. 3) in annular groove formed in a part 14 extending from the upper one of a pair of pole pieces 15 of the body component 10 and is adapted to be brazed thereto. Each of the pole pieces 15, which extend from opposite ends of a central portion 17, is rectangular in cross section and has flat sides 18 which are disposed perpendicularly to the flat end faces 19 of the central portion 17, which faces 19 project laterally beyond the pole pieces 15, as shown in Figs. 1 and 3. The body component 10 has a cylindrical output portion 20 extending from one side thereof and a plurality of heat radiating fins 21 extending from the other three sides thereof.

The fixture 8 comprises a base 26 on which are mounted a pair of supports 27 spaced apart and recessed to provide a nest 28 engageable with the edge portions of one of the pole pieces 15 for supporting the body component 10 with the component 11 resting on the annular part 14, as indicated in Fig. 1. An annular member 29 rests on the upper end of the component 11 to hold it on the component 10 and an aligning arbor 30 extending through the member 29 and in engagement with the interior of the component 10 is supported in a predetermined vertical position on the base for maintaining the components 10 and 11 in alignment. The base 26 is secured to a plunger 32 and the plunger is movable to raise the fixture 8 from a lower position where the magnetron may be placed thereon and removed therefrom to an upper position with the juncture of the parts 12 and 13 disposed coaxially within an annular induction heating coil 34 of a brazing apparatus.

Four cooling elements 40 in the form of elongated substantially rectangular blocks are movable into engagement with portions of the component 10 for cooling it during the brazing operation. Each of the cooling elements is pivoted on one of a pair of vertical pivot pins 41 which extends through bores 42 in one end of the cooling elements 40 and through apertures 44 in the laterally extending arm portions 45 of a bracket 46 which is fixed to the base 26. The cooling elements 40 are arranged in horizontal pairs with one pair supported on the upper surface of the arms 45 at a level for movement horizontally into engagement with opposite sides 18 of the upper pole piece 15 and the upper end face 19 of the central portion 17, and the lower pair of cooling elements are supported against the lower face of the arms 45 for horizontal movement into engagement with the opposite sides 18 of the lower pole piece 15 and the lower end face 19 of the portion 17 of the component 10.

Each of the cooling elements 40 is provided with a longitudinally extending bore 48 having a reduced end portion 49 from which a pipe 50 extends with the obliquely disposed end 51 thereof positioned adjacent and in spaced relation to the end of the bore 48 which is closed by a plug 52. Ports 55 connected with the end portions 49 of the bore have flexible conduits 56 connected thereto which are connectible to suitable means for supplying and circulating coolant to the cooling elements. Ports 58 communicating with one end of the bore 48 are connected by flexible conduits 59 which interconnect each pair of cooling elements 40 arranged in vertical alignment with each other on opposite sides of the magnetron. The flexible conduits 59 may serve as handles, by means of which the vertically aligned pairs of cooling elements 40 may be moved together from an open position shown in dotted lines in Fig. 4 to a closed position shown in full lines, with the cooling elements 40 in engagement with the magnetron component 10, while permitting limited movement of the individual cooling elements 40 relative to each other. Vertical and horizontal cooling faces 62 and 63, respectively, on each of the cooling elements 40 are adapted to engage with the sides 18 of the pole pieces 15 and with portions of the end faces 19, respectively, of the component 10 when the cooling elements 40 are in their closed position.

The pivot pins 41 have heads or collars 67 on opposite ends thereof, the lower ones of which engage the lower surfaces of the cooling elements 40 and the upper ones of which are disposed in the enlarged portions of the apertures 42 in the upper cooling elements 40 (Fig. 2). Coil springs 69 encircling the pivot pins 43 and reacting between the upper collars 67 and shoulders formed on the cooling elements serves to urge the upper cooling elements 40 downwardly against the lower surface of the arms 45. Ridges 70 are formed on the lower portion of the upper cooling elements 40 and on the upper portion of the lower cooling elements at one end thereof and in spaced relation to the pivot pins 41 to serve as fulcrum points about which the cooling elements 40 may be tilted slightly in a vertical direction by the springs 69 to press the cooling faces 63 of the cooling blocks against the faces 18 of the component 10. A slight tilting of the cooling elements 40 is permitted by a small clearance between the pivot pins 41 and the apertures 42 in the cooling elements.

Resilient means are provided for urging the cooling elements into engagement with the flat sides 18 of the pole pieces 15 when the elements have been moved into their closed position. Vertically disposed end portions 72 of L-shaped rods 73 are pivotally connected to the cooling elements 40 adjacent the supporting bracket 46 and the pivot pins 43. The ends of the horizontally disposed portions of the rods 73 fit into slots in stationary members 74 formed on the upper and lower portions of brackets 75 in the form of a plate extending laterally from and secured to the supporting bracket 46. Expansion springs 76 mounted on the rods 73 react between a collar 77 fixed to the rods 73 and a washer 78 engaging the bracket 76 and loosely mounted on the rod 73 for stressing the cooling elements 40 for oscillation about the pivot pins 41 so that when the elements are moved to their closed position they serve to yieldably maintain the cooling surfaces 62 of the elements in engagement with the flat sides 18 of the pole pieces 15. The rods 73 and springs 76 in cooperation with the cooling elements 40 and the pivot pins 41 form an over-center spring arrangement which serves to maintain the elements 40 in their open position with the end surfaces 80 of the blocks 40 engaging stop surfaces 81 on a portion of the bracket 46.

After the components 10 and 11 have been assembled on the arbor 30 and seated in the nest 28 on the fixture, the cooling elements 40 are moved from their open position to their closed position in engagement with opposite sides of the component 11 and with the surfaces 62 and 63 of the cooling elements in contact with the surfaces 18 and 19, respectively, of the component 10 and the springs 69 and 76 serve to maintain the cooling elements in tight engagement with the surfaces 18 and 19 to cool the component 10 during the brazing operation.

It is to be understood that the above-described arrangements are simply illustrative to the application of the principles of this invention. Numerous other arrangements may be readily devised by those skilled in the art which will embody the principles of the invention and fall within the spirit and scope thereof.

What is claimed is:

1. A fixture for supporting and cooling a composite article during brazing of the components, a base means on said base for supporting said components in superposed relation, a pair of horizontally disposed hollow cooling blocks having ports connectible to means for supplying coolant therethrough and having vertically disposed bores adjacent one end thereof, each of said blocks having a first cooling face and a second cooling face angularly disposed relative to each other, a member on said base in horizontally spaced relation to said supporting means having a horizontal surface and pivot pins extending vertically therefrom through the bores in said cooling blocks for supporting the cooling blocks on opposite sides of the supporting means for horizontal pivotal movement and for engagement of the first cooling faces with a first pair of surfaces on opposite sides of one of said components on the supporting means and for limited vertical pivotal movement for engagement of the second cooling faces with a second pair of surfaces on said component extending transversely of said first surfaces, said cooling blocks having projections on the lower face thereof in horizontal spaced relation to the bores therein and engageable with the horizontal surface on said member in spaced relation to the pivot pin to form fulcrums for said vertical pivotal movement of said blocks, spring means encircling the pivot pins for stressing said blocks vertically into engagement with said second pair of surfaces, and spring means for urging said cooling blocks horizontally toward said supporting means into engagement with said first pair of flat surfaces on said component.

2. A fixture for supporting and cooling a composite article during brazing of the components thereof comprising a base, means on said base for supporting said components in engagement with each other, a first pair of horizontally disposed hollow cooling blocks having vertical faces engageable at one level with a first pair of vertical surfaces on opposite sides of one of said components on the supporting means and having horizontal faces engageable with a first pair of horizontal surfaces on said component, a second pair of horizontally disposed hollow cooling blocks having vertical faces engageable at another level with a second pair of vertical surfaces on opposite sides of said one component and having horizontal faces engageable with a second pair of horizontal surfaces on said component, a member disposed laterally of said holding means on said base and having upper and lower horizontal surfaces engageable with said first and said second pair of hollow cooling elements and disposed at predetermined elevations for positioning said cooling elements at said levels, said first and said second pairs of hollow cooling blocks and said member having aligned vertical bores, a pair of pivot rods extending through the aligned vertical bores for supporting said blocks on opposite sides of said supporting means and the article supported thereon for horizontal oscillatable movement into engagement with said component and for limited pivotal movement in vertical planes, each of said rods having a first head on one end thereof engageable with one of said blocks and a second head on the other end thereof, spring means on each of said pivot rods disposed between said second head and one of said cooling blocks for urging the pair of blocks on each rod towards each other and into engagement with the horizontal surfaces on said component, projections formed on the lower side of the upper one and the upper side of the lower one of said cooling blocks engageable with said horizontal surfaces on said member in horizontally spaced relation to the pivot rods to form fulcrum points about which the cooling blocks may pivot for vertical movement, spring means for urging said cooling blocks for horizontal movement toward the article on said supporting means into engagement with said vertical surfaces on said one component, and means on said hollow cooling blocks connectible to means for circulating coolant through the hollow blocks.

References Cited in the file of this patent

UNITED STATES PATENTS

| 1,712,946 | Williams | May 14, 1929 |
|---|---|---|
| 2,364,689 | Brooks | Dec. 12, 1944 |
| 2,485,836 | MacConnell | Oct. 25, 1949 |
| 2,768,596 | Kalbow et al. | Oct. 30, 1956 |